US012629629B2

(12) United States Patent
Venkatesan et al.

(10) Patent No.: US 12,629,629 B2
(45) Date of Patent: May 19, 2026

(54) METHOD AND SYSTEM FOR OPERATING AN ADSORPTION-BASED SYSTEM FOR REMOVING WATER FROM A PROCESS STREAM

(71) Applicant: SHELL USA, INC., Houston, TX (US)

(72) Inventors: Saravanan Venkatesan, Bangalore North (IN); VenKatesh Kattigari Madyastha, Bangalore North (IN); Isabel Marguerite Antonia Conradus, Amsterdam (NL); Cornelis Marco Smaling, Amsterdam (NL)

(73) Assignee: SHELL USA, INC., Houston, TX (US)

( * ) Notice: Subject to any disclaimer, the term of this patent is extended or adjusted under 35 U.S.C. 154(b) by 578 days.

(21) Appl. No.: 17/906,869

(22) PCT Filed: Apr. 1, 2021

(86) PCT No.: PCT/EP2021/058636
§ 371 (c)(1),
(2) Date: Sep. 21, 2022

(87) PCT Pub. No.: WO2021/204678
PCT Pub. Date: Oct. 14, 2021

(65) Prior Publication Data
US 2023/0182065 A1      Jun. 15, 2023

(30) Foreign Application Priority Data

Apr. 7, 2020    (IN) ............................. 202041015254
May 25, 2020    (EP) ...................................... 20176309

(51) Int. Cl.
*B01D 53/04*        (2006.01)
*C10L 3/10*          (2006.01)

(52) U.S. Cl.
CPC .......... *B01D 53/0462* (2013.01); *C10L 3/106* (2013.01); *B01D 2253/108* (2013.01);
(Continued)

(58) Field of Classification Search
CPC .................... B01D 53/261; B01D 2259/40086
See application file for complete search history.

(56) References Cited

U.S. PATENT DOCUMENTS 3,706,812 A    12/1972    Armand et al.
3,808,773 A     5/1974    Reyhing et al.
(Continued)

OTHER PUBLICATIONS

International Search Report and Written Opinion received for PCT Patent Application No. PCT/EP2021/058636, mailed on Jun. 8, 2021, 10 pages.
Herold et al., "Optimal Design and Operation of Molecular Sieves for Gas Dehydration", Gas Processing & LNG, 2017-18, 4 Pages.
Terrigeol et al., "Water Content Assessment in Acid Gas", Gpa Europe, Annual Conference, Sep. 16-18, 2015, 21 Pages.

*Primary Examiner* — Jennifer Dieterle
*Assistant Examiner* — Rachel Marie Slaugovsky
(74) *Attorney, Agent, or Firm* — SHELL USA, INC.

(57) ABSTRACT
A method for operating an adsorption-based system for removing water and potentially other components from a feed stream. The system includes at least two dehydration units each comprising an adsorption bed. The method includes the steps of: i) obtaining process data from one or more sensors at a predetermined time resolution, the sensors at least comprising at least one moisture sensor at a specified location in each of the dehydration units; ii) dehydrating the feed stream by operating the adsorption-based system in regenerative mode, wherein at least one active unit of the at least two dehydration units is in an adsorption cycle, and wherein at least another one of the at least two dehydration units is being regenerated; iii) estimating an adsorption bed water adsorption capacity during every adsorption cycle;
(Continued)

and iv) using the process data to update the estimated adsorption bed water adsorption capacity.

14 Claims, 9 Drawing Sheets

(52) U.S. Cl.
CPC .. *B01D 2256/245* (2013.01); *B01D 2257/304* (2013.01); *B01D 2257/504* (2013.01); *B01D 2257/80* (2013.01); *B01D 2259/40009* (2013.01); *B01D 2259/402* (2013.01); *B01D 2259/403* (2013.01); *C10L 2200/0295* (2013.01); *C10L 2290/08* (2013.01); *C10L 2290/542* (2013.01); *C10L 2290/58* (2013.01); *C10L 2290/60* (2013.01)

(56) References Cited

U.S. PATENT DOCUMENTS

| | | | | |
|---|---|---|---|---|
| 4,402,832 | A | 9/1983 | Gerhold | |
| 8,521,310 | B2 * | 8/2013 | Axelrud | G05B 13/048 |
| | | | | 700/32 |
| 9,126,875 | B2 | 9/2015 | Pieper et al. | |
| 2009/0259323 | A1 * | 10/2009 | Kesavan | B01D 53/047 |
| | | | | 700/44 |
| 2018/0056235 | A1 | 3/2018 | Wang et al. | |
| 2018/0311609 | A1 * | 11/2018 | McCool | G05B 19/401 |
| 2018/0362862 | A1 * | 12/2018 | Gellaboina | G05B 13/042 |
| 2019/0111377 | A1 * | 4/2019 | Dube | B01D 53/0454 |
| 2021/0213384 | A1 * | 7/2021 | Ghanbari | C10L 3/106 |
| 2022/0161187 | A1 * | 5/2022 | Lee | B01D 53/0462 |

* cited by examiner

NUMBER OF ADSORPTION CYCLES

NUMBER OF ADSORPTION CYCLES

METHOD AND SYSTEM FOR OPERATING AN ADSORPTION-BASED SYSTEM FOR REMOVING WATER FROM A PROCESS STREAM

CROSS REFERENCE TO RELATED APPLICATIONS

This is a National stage application of International application No PCT/EP2021/058636, filed 1 Apr. 2021, which claims priority of IN application No. 202041015254, filed 7 Apr. 2020 and EP application Serial No. 20176309.1, filed 25 May 2020 which is incorporated herein by reference in its entirety.

FIELD OF THE INVENTION

The present invention is directed to a method and system for removing water from a process stream. The method and system may manage operation of a plant that removes contaminants from the process stream using adsorbents. For instance, the process stream may be natural gas and the contaminants may be water and sulfur components. After the removal of water and potentially other contaminants, the purified (natural) gas can be processed further, for instance be liquefied to provide liquefied natural gas (LNG).

BACKGROUND TO THE INVENTION

In the broad sense we are talking about a plant that needs to remove contaminants from a hydrocarbon or hydrogen stream to enable further processing or meet product specifications. An LNG plant is an example. Gas streams from natural gas wells typically comprise contaminants such as carbon dioxide, hydrogen sulphide, aromatic hydrocarbons (such as benzene, toluene, ethylbenzene, and xylene), and water (typically water vapor). In an LNG plant, it is imperative that the feed to the LNG cryogenic block meets stringent specifications with respect to contaminants. These components could freeze when the gas is liquefied, leading to plugging of equipment and, in turn, a plant shutdown and lost production. Therefore, the contaminants are typically removed to below a preset threshold before the gas stream is forwarded to the liquefaction section.

Processes for removing one or more of acid gases, such as hydrogen sulfide and carbon dioxide, and/or aromatic hydrocarbons from the gas stream typically comprise an absorption step. Herein, the gaseous feed stream is contacted with a solvent in an absorption column. The absorption unit may also be referred to as amine unit or acid gas removal unit (AGRU).

The absorption unit provides a purified gaseous stream and a solvent loaded with contaminants. The loaded solvent is typically regenerated in a stripper to obtain a gas stream comprising contaminants and a lean solvent that is recycled to the absorption column. However, due to the water content of the solvent, the cleaned gas stream will typically comprise a certain amount of water, typically water vapor, which may need to be removed to enable further processing.

The gas can be dehydrated in a subsequent adsorption process. The adsorption process can use any suitable selective adsorbent. The selective adsorbent can, typically, comprise a selective molecular sieve, or molsieve. A dehydration unit may comprise a molsieve section. The molsieve section may comprise two or more molsieve units operating in parallel. Herein, one or more molsieve units may be in operation for dehydrating the process stream, while at least one other molsieve unit is being regenerated. The "molsieve unit" is an example of an adsorption unit. The present disclosure is applicable to a molsieve unit, not excluding other adsorption units.

In the liquified natural gas (LNG) industry, the water content of the gas needs to be reduced to less than a preset threshold, of for instance 0.1 ppmv, to prevent blockages caused by ice during further processing.

Each adsorption unit has a certain maximum water holding capacity. Upon approaching said maximum capacity, the concentration of water in the output of the adsorption unit will rise above the preset threshold, causing a so-called breakthrough. Water breakthrough must be prevented, otherwise the water included in the output of the adsorption unit may cause blockages in the corresponding liquefaction unit, causing plant shutdown. Problem is however that said maximum capacity is only indicative and may vary depending on other factors. These other factors may include pressure, temperature and composition of the feed gas (which may influence the capacity to hold water); contaminant content of the feed gas (for example $CO_2$, $H_2S$, hydrocarbons and other components that could originate from processing sections upstream of the adsorption unit); age of the molsieve (capacity decreases with age) and number of regeneration cycles.

To predict water breakthrough events and prevent unexpected shutdown, water breakthrough tests are typically conducted on site to understand the remaining molsieve bed capacity and the remaining useful life of the bed. Calculations are typically made offline using empirical models. The breakthrough tests are typically conducted periodically (for example, once in 3-6 months). These tests can be cumbersome and to an extent risky, because during test, water breakthrough may result in water freeze outs and upsets to the liquefaction unit if it is not properly controlled.

US20180311609 discloses a system, wherein monitoring adsorbers and the processes using adsorbers may be performed to determine if the adsorbent bed is reaching saturation, other problems are occurring, or if equipment failures are imminent. Monitoring also helps to predict behavior or problems in different adsorbers used in the same plant or in other plants and/or processes. The system of US20180311609 is however described at such high level that it would be difficult if not impossible for a general engineer to accurately determine when an adsorbent bed is reaching, or has reached, saturation.

U.S. Pat. No. 8,521,310 discloses a system to monitor and control a molecular sieve dehydration unit using Pressure Swing Adsorption (PSA). A sentinel component can provide real-time in situ tracking of a parameter associated with the PSA unit and dynamically adjust the PSA timers based upon the real-time tracked parameter.

It is an aim to provide an improved process and system to monitor remaining lifetime of a molsieve bed. Improved herein may relate to one or more of improved accuracy, extended lifetime, ability to handle a wider range of water content in the feed gas, and lower cost. Aim is to more accurately determine when an adsorbent bed has reached a predetermined threshold saturation.

SUMMARY OF THE INVENTION

In one aspect, the present invention is directed to
for operating an adsorption-based system for removing water and potentially other components from a feed stream, the system including at least two dehydration units each comprising an adsorption bed, the method including the steps of: i) for a first adsorption cycle, provide an initial adsorption capacity as adsorption capacity estimate for each adsorption bed;

ii) dehydrating the feed stream by operating the adsorption-based system in regenerative mode, wherein at least one active unit of the at least two dehydration units is in an adsorption cycle, and wherein at least another one of the at least two dehydration units is being regenerated;

iii) obtaining process data from one or more sensors at a predetermined time resolution, the sensors at least comprising at least one moisture sensor at a specified location in each of the dehydration units;

iv) estimating an updated adsorption capacity for each adsorption bed based on a first adsorption capacity degradation model;

v) for a subsequent adsorption cycle, replacing the adsorption capacity estimate for each bed with the updated adsorption capacity;

vi) monitoring the at least one moisture sensor during each adsorption cycle to detect water breakthrough with respect to a threshold;

vii) if the at least one moisture sensor detects water at a concentration that exceeds the threshold during a respective adsorption cycle, calculate an updated adsorption capacity estimate using the total water adsorbed at the time of breakthrough time (W) and a height of the respective adsorption bed above the at least one sensor; and viii) using the updated adsorption capacity estimate to provide a second degradation model;

ix) replacing the first adsorption capacity degradation model with the second degradation model, and x) for a subsequent adsorption cycle, estimating the updated adsorption capacity for each adsorption bed based on the second adsorption capacity degradation model.

In an embodiment, the step of estimating the adsorption bed water adsorption capacity comprising: providing an adsorption capacity degradation model; estimating the water adsorption capacity at the start of every adsorption cycle based on said adsorption capacity degradation model.

In another embodiment, the step of using the process data to update the estimated adsorption bed water adsorption capacity comprising adapting the adsorption capacity degradation model when a water breakthrough was detected by at least one moisture sensor.

The sensors may include one or more of:
feed stream flow rate sensor;
feed stream pressure sensors;
temperature sensors;
feed stream moisture sensor;
status sensors of adsorption valves for each of the dehydration units;
the at least one moisture sensor comprising at least one sampling probe connected to an analyzer;
product gas moisture sensor;
product gas CO2 sensor;
regeneration gas flow rate sensor;
regeneration gas pressure sensor; and
regeneration gas temperature sensor.

The step of using the process data to update the estimated adsorption bed water adsorption capacity may comprise:
monitoring the at least one moisture sensor of the at least one active dehydration unit to detect water breakthrough with respect to a minimum threshold;
if water breakthrough has happened during an adsorption cycle, by exceeding the minimum threshold, calculating a current water adsorption capacity of the at least one active dehydration unit.

In an embodiment, the method includes adapting the adsorption capacity degradation model based on the calculated values of the water adsorption capacity, to provide an adapted degradation model.

The method may comprise the steps of:
once the adsorption capacity degradation model has been adapted, use the adapted degradation model to forecast values of the water adsorption capacity for subsequent adsorption cycles; and
using the forecasted value of the water adsorption capacity during the subsequent adsorption cycle.

In an embodiment, the method comprises the steps of:
if water breakthrough has not happened during an adsorption cycle before a respective adsorption bed is switched out for regeneration, keep the latest version of the adsorption capacity degradation model and use as water adsorption capacity for the next adsorption cycle after regeneration a forecasted value of water adsorption capacity based on said latest version.

Herein, the method may comprise the step of:
using the latest version of the adsorption capacity degradation model to compute a remaining number of adsorption cycles and an associated time until qcurrent reaches a predetermined replacement value at which the adsorption bed of the respective adsorption unit is to be replaced.

In an embodiment, the method comprises the steps of:
using the calculated water adsorption capacity (qcurrent) to calculate a location of a mass transfer zone (MTZ) in a respective adsorption bed and/or to calculate the time it takes for the MTZ to reach a certain location.

The method may comprise the step of repeating all steps until a respective dehydration unit reaches its end of life.

The time resolution may be in the order of seconds or minutes, for instance about 1 minute.

The method may include the step of calculating water content adsorbed in a respective adsorption bed, based on feed gas flow rate, water content in the feed gas, and duration of a respective adsorption cycle. The step of estimating the total water adsorbed at the time of breakthrough time (W) may use parameters of the feed stream including flow rate, pressure, temperature and composition.

The step of calculating the current water adsorption capacity may include using the formula:

$$q_{current} = W/[(L_{SZ,current} + c*L_{MTZ,current})*A_{bed}*\rho_{bulk}]$$

wherein:

W is quantity of water adsorbed by a respective adsorbent bed since the start of the current adsorption cycle;

$L_{SZ,current}$ is an estimated bed length from a top of a respective adsorption bed to a lower front of a Saturated Zone (182) for the same bed and at the same point in time as W;

c is a constant;

$L_{MTZ,current}$ is the estimated length of a mass transfer zone (MTZ) for the same bed and at the same point in time as W;

$A_{bed}$ is cross sectional area of the respective adsorption bed; and $\rho_{bulk}$ is a bulk density of the respective adsorption bed.

Herein, the feed stream may comprise natural gas, air, a gas containing predominantly hydrocarbons and/or hydrogen and/or CO2. The adsorption bed may be a molecular sieve bed.

According to another aspect, the disclosure provides Adsorption-based system for removing water and potentially other components from a feed stream, the system including:

at least two dehydration units arranged in parallel, each dehydration unit comprising an adsorption bed; and one or more sensors for obtaining process data at a predetermined time resolution, the sensors at least comprising at least one moisture sensor arranged at a specified location in each of the dehydration units;

the system being adapted for dehydrating the feed stream by operating the system in regenerative mode, wherein at least one active unit of the at least two dehydration units is in an adsorption cycle, and wherein at least another one of the at least two dehydration units is being regenerated; and the system being adapted for using the process data for estimating an adsorption bed water adsorption capacity during every adsorption cycle in accordance with the method described above.

The method and system of the disclosure are applicable to molsieve units and other adsorption units with similar functionality. Herein, one or more units are in operation while at least one other unit is being regenerated.

BRIEF DESCRIPTION OF THE DRAWINGS

The drawing figures depict one or more implementations in accord with the present teachings, by way of example only, not by way of limitation. In the figures, like reference numerals refer to the same or similar elements. Herein.

DETAILED DESCRIPTION OF THE INVENTION

Certain terms used herein are defined as follows:

(Feed) gas stream may encompass any stream of (feed) gas, including but not limited to pipeline gas and natural gas.

Natural gas is a general term that may refer to mixtures of light hydrocarbons and optionally other gases (nitrogen, carbon dioxide, helium) derived from natural gas wells. The main component of natural gas is methane. In addition to methane, natural gas may comprise higher hydrocarbons, such as ethane, propane and butane.

In some cases (small) amounts of heavier hydrocarbons may be comprised in the natural gas, often indicated as natural gas liquids or condensates. When produced together with oil, the natural gas may be referred to as associated gas. Other compounds that may be present as contaminants in natural gas in varying amounts include carbon dioxide, hydrogen sulphide, and aromatic compounds.

The feed gas stream may comprise H2S, for example in the range between 0 to about 10 vol % or more, based on the total feed gas stream. The feed gas stream may also comprise carbon dioxide, for example in the range from 0 to about 40 vol %, based on the total feed gas stream.

Figure 1:
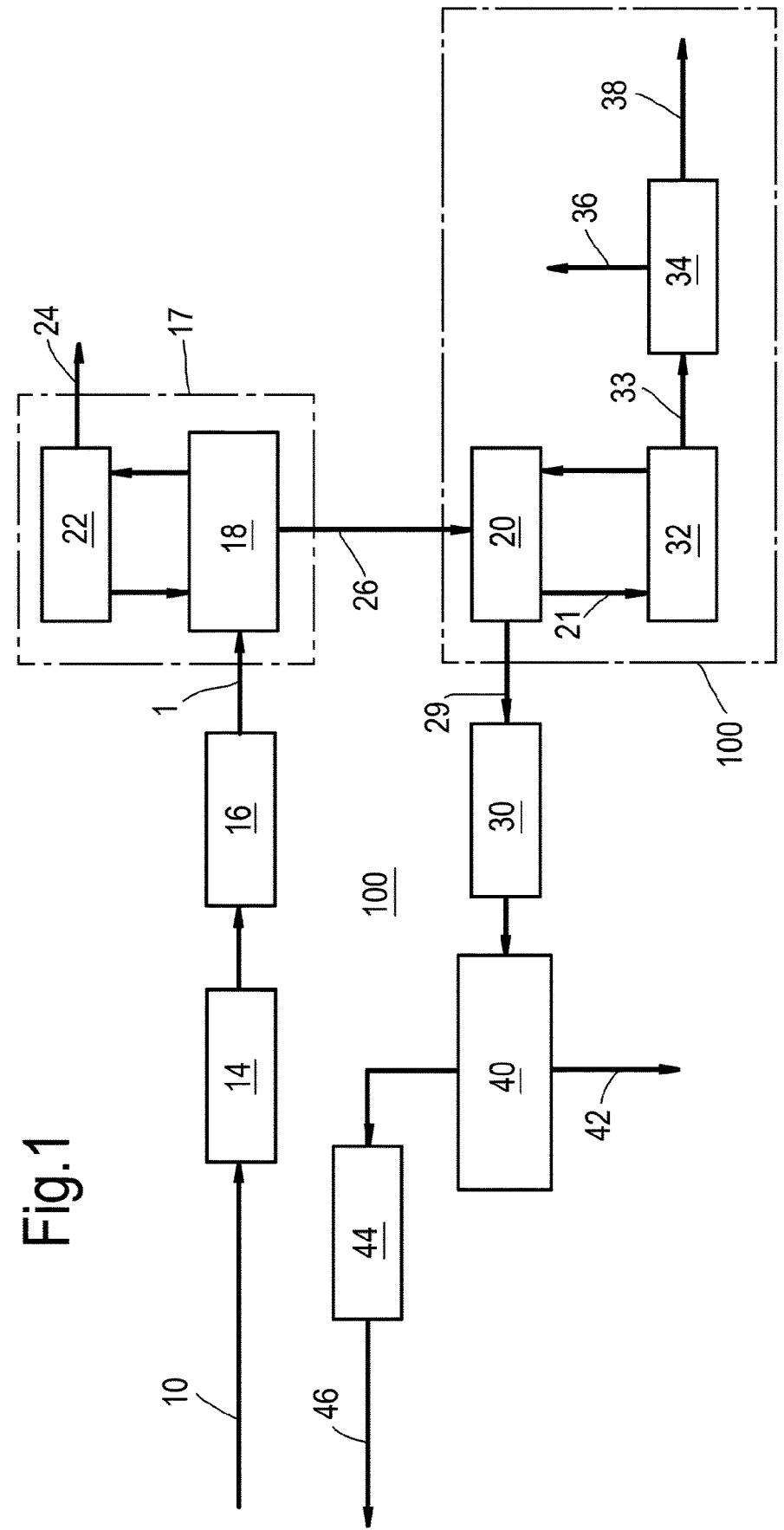
FIG. 1 schematically shows an example of a gas treatment section, comprising an adsorption unit.

FIG. 1 shows a pretreatment section 1 for pretreating a feed gas 10 and providing a pre-treated gas suitable for subsequent liquefaction. The pretreatment section 1 may comprise a separator 14 and a pre-heater or cooler 16. The lineup may feature an acid gas removal unit (AGRU) 17, for removing CO2 and/or hydrogen sulphide (H2S). The AGRU 17 may comprise an absorber 18. The absorber 18 may be coupled to a regenerator 22 (which is also part of AGRU 17) for producing AGRU waste stream 24.

An AGRU output stream 26 may be forwarded to a dehydration section 100. The dehydration section may comprise an adsorbent section or molecular sieve (molsieve) section 20 for dehydration of the AGRU output stream 26. A molsieve waste stream 21 may be provided to a regenerator 32, for providing a regenerator output stream 33 to a two-phase separator 34. The separator 34 may provide a vapor stream 36 and a liquid stream 38. Molsieve output stream 29 may be provided to pre-cooler 30.

Following the pre-cooler 30, a lineup may typically comprise an NGL extraction and fractionation unit 40. The NGL extraction may remove contaminants and C5+ in an NGL stream 42. A second pre-cooler 44 may be connected to an outlet of the NGL extraction unit. This allows the pretreatment unit 1 to provide pretreated feed gas 46 suitable for a main cryogenic heat exchanger (MCHE) of a cryogenic liquefaction block (not shown). Alternatively, the lineup may include a cold flash, instead of (or in addition to) the NGL extraction unit 40.

Figure 2:
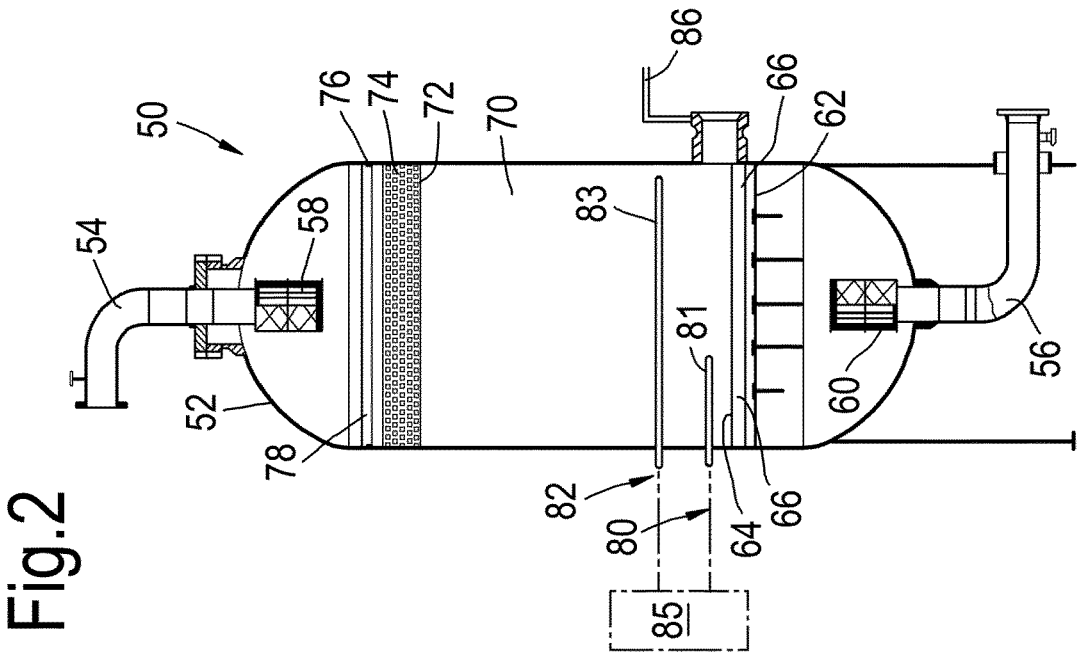
FIG. 2 schematically shows a cross section of an exemplary vessel in an adsorption unit suitable for dehydration.

Referring to FIG. 2, a dehydration section 20 may comprise one or more molsieve units 50. An exemplary molsieve unit 50 may comprise a vessel 52 having an inlet conduit 54 and an outlet conduit 56 for the process stream. An end of the inlet conduit may be provided with an inlet distributor 58 arranged inside the vessel 52. An end of the outlet conduit 56 may be provided with an outlet distributor 60 arranged inside the vessel 52. The vessel may contain one or more of a support screen 62 and wire mesh 64 to hold the molecular sieve, a layer of ceramic balls 66 arranged between the screen 62 and the wire mesh 64, a dump port 68, a molsieve layer 70, a second wire mesh 72, a guard layer 74, a second layer of ceramic balls 76, and a second screen or cover 78.

The vessel may be provided with one or more sensors 80, 82, arranged at respective levels. The sensors may comprise sampling ports 81, 83 allowing to take samples from the internals of the vessel and analyze the water content thereof in a suitable analyzer 85. The samples may comprise part of the gas in molsieve bed 70. Sampling port 81 may be located close to the bottom end of bed 70. A second sampling port 83 may be located somewhere between the middle of bed 70 and sampling port 81.

A molecular sieve is a material with pores (very small holes) of, typically, uniform size. These pore diameters are similar in size to small molecules, and thus large molecules cannot enter or be adsorbed, while smaller molecules can. As a mixture of molecules migrates through the stationary bed of solid and partly porous substance referred to as a sieve (or matrix), the components of highest molecular size and shape (which are unable to pass into the molecular pores) leave the bed first, followed by successively smaller molecules.

The diameter of pores of a molecular sieve can be expressed in angstroms (Å) or nanometers (nm). According to IUPAC notation (International Union of Pure and Applied Chemistry), microporous materials have pore diameters of less than 2 nm (20 Å) and macroporous materials have pore diameters of greater than 50 nm (500 Å); the mesoporous category thus lies in the middle with pore diameters between 2 and 50 nm (20-500 Å). For dehydration, and especially for molecular sieve units used in LNG application, type 4 A can be used. A molecular sieve may be composed of a zeolite and a binder, typically clay. The binder is used as a glue to strengthen the particles. The type of zeolite used for dehydration may be the Linde Type A (LTA). Herein, 'A' refers to Angstrom, indicating the diameter of the zeolite channels where the water is adsorbed. I.e., 4 A refers to a zeolite with a channel diameter of 4 Angstrom (0.4 nm). Apart from 4 A, 3 A LTA and 5 A LTA sieves are also used. In these sieves, the type of cation determines the channel diameter ($K^+$ for 3 A, $Na^+$ for 4 A and $Ca^{2+}$ for 5 A). Another suitable adsorbent may have pore diameters of about 3 Å, such as commercially available type 3 molecular sieves produced by Honeywell UOP™ (US), formerly known as UOP LLC or Universal Oil Products. Adsorbents which are suitable for the separation of water from hydrocarbon gas may have relatively uniform pore diameters. Molecular sieves can remove gas or liquid impurities, including water, to very low levels (ppm or less).

The separation can be performed in a regenerative or non-regenerative mode including the use of two or more adsorbent beds in cyclic operation. In regenerative mode, one or more beds are used for the separation, while at least one other bed is being regenerated. The sequential adsorption and desorption steps of an adsorptive separatory process may be performed using a fixed bed of adsorbent having fixed inlet and outlet points at opposite ends of the adsorbent bed, as indicated in the exemplary molsieve unit 50 (FIG. 2).

The adsorbent process can be practiced using any type of commercially operable and practical selective adsorbent. The selective adsorbent can comprise a shape selective molecular sieve. The term "shape selective" refers to the molecular sieve's ability to separate molecules according to size or shape because of the fixed and relatively uniform cross-sectional diameter of the molecular sieve's pore structure. One suitable shape selective molecular sieve is a zeolite. Suitable zeolites comprise synthetic crystalline aluminosilicates. Since the pure zeolites are relatively soft and powdery, the commercially used molecular sieves comprise a binder such as clay or alumina to produce a stronger and more attrition-resistant adsorbent particle.

Adsorptive separation processes can be operated with both vapor-phase and liquid-phase conditions. The use of vapor-phase conditions is preferred for processing natural gas. A pressure of about 0.1 MPa (g) to about 15 MPa (g) may be employed, or about 0.1 MPa (g) to about 6 MPa (g). Suitable operating temperatures range from about 0° C. to about 350° C.

The method and system of the present disclosure are suitable for, for instance, hydrocarbon fluid or gas dehydration units using fixed beds of adsorbents. In a practical embodiment, the method and system are suitable for dehydration of natural gas, for instance in preparing the gas for LNG production.

Flow rate of respective process streams may be measured in [tonne/day], pressure in [MPa] or [psi], and content (moisture/water; CO2, etc.) in [mol-ppm]. The flow rate is typically expressed in metric tonne per day, given the industrial scale of operation, with relatively high flow rates. LNG production for an entire LNG train may be in the order of 1 to 8 mega-tonne per year (mtpa) per train. Corresponding mass flow rate of the total process stream, for instance feed stream 10 in FIG. 1, may be in the order of 25 to 300 kg/s. The dehydration units 50 will typically have a design capacity enabling each unit to handle their equal share of the process flow. For three units, wherein two are in operation, each unit would have a design capacity in the order of, at least, a process flow of 12.5 to 150 kg/s.

Figure 3:
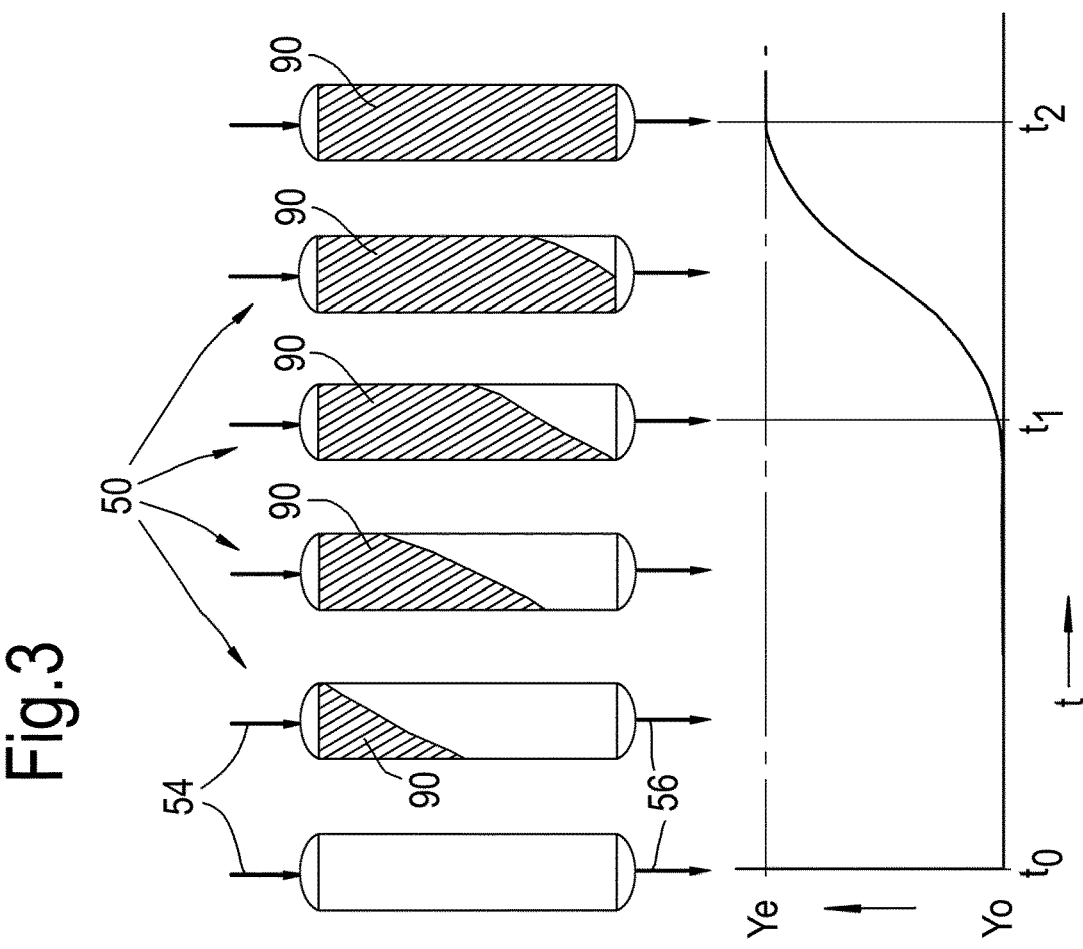
FIG. 3 schematically shows an example of loading of adsorbent of an adsorption unit and potential water content in an outlet stream at consecutive moments in time.

FIG. 3 shows two diagrams above each other, indicating water loading in time during adsorption. The upper diagram shows the dehydration unit 50 at consecutive moments in time, with an increasing amount of water loading 90. The lower diagram in FIG. 3 indicates time t on the horizontal axis, and water content Y in the outlet stream in the outlet conduit 56 on the vertical axis.

During operation, the molsieve bed 70 in the unit 50 adsorbs water, resulting in water loading 90 commencing near the inlet 54 and over time progressing towards the outlet 56 as more and more of the molsieve bed 70 becomes saturated. At time $t_1$, the molsieve bed 70 has become saturated up to a point wherein water content in the outlet stream starts to increase from the desired very low level $Y_0$ (i.e. near zero, below 1 ppm) up to a point—at time $t_2$—wherein all the water in the inlet stream passes the molsieve, so that water content in the outlet stream will be the same as that in the inlet stream, indicated by level $Y_C$.

As discussed above, for natural gas liquefaction, water breakthrough as commencing at time $t_1$ needs to be avoided. Yet, for an industrial process like liquefaction of natural gas, extending the uptime of equipment like the molsieve unit 20 and each of its units 50 typically provides significant cost advantages. Producing additional units of production (i.e. LNG) with the same equipment (providing a cost basis due to capital and operational expenditure) is especially beneficial. It is therefore a desire to keep each molsieve unit 50 in production for as long as possible, i.e. to operate every adsorption cycle as close to time $t_1$ as possible without exceeding it. However, as mentioned above, time $t_1$ may differ significantly during real life operation from an estimated value time $t_{1,est}$, which may have been determined during testing of equipment in an isolated laboratory environment. Therefore, a mere timer is insufficient to produce up to time $t_1$, while avoiding exceeding time $t_1$.

Figure 4:
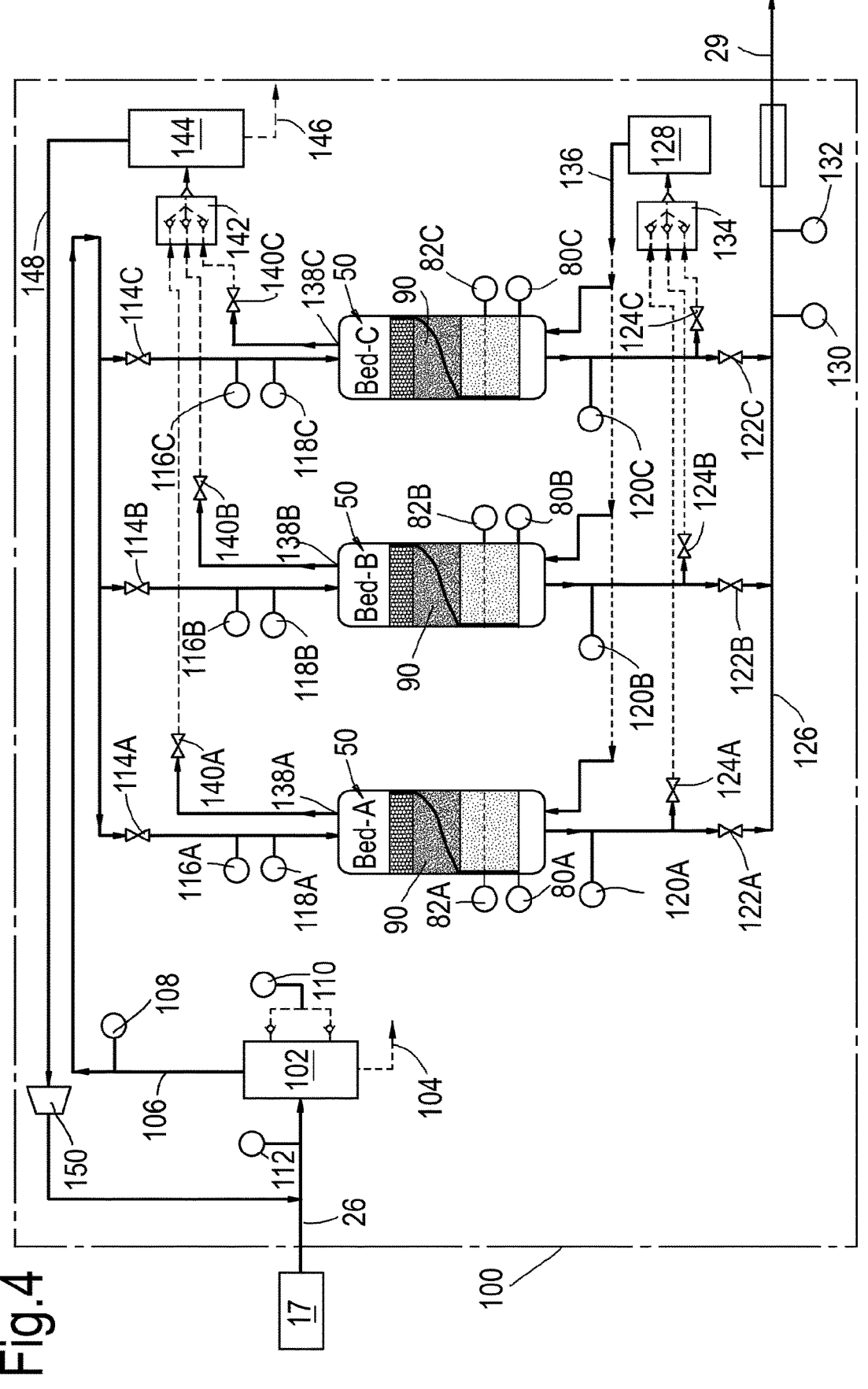
FIG. 4 shows a schematic overview of an adsorption system according to the present disclosure.

FIG. 4 shows an example of a dehydration system 100 for regenerative mode operation of two or more dehydration units 50. Herein, at least one unit 50 can be regenerated (i.e.

brought back to a starting condition, ready for dehydration of a process stream) while at least one or more other units 50 are in operation, adsorbing water from a process stream. For instance, the process stream is the outlet stream 26 of the acid gas removal unit (AGRU) 17. The dehydration section 100 may comprise a knock-out drum (KOD) 102 to separate the process stream 26 in liquid components (at the operating conditions), including water (H2O), from gaseous components (at the operating conditions), including methane. The liquid components will be included in bottom stream 104, while gaseous components will be included in top stream 106. Flow sensor 108 may be provided for measuring the flow $Q_{KOD}$ of the process stream 108 leaving the knock-out drum. The knock-out drum 102 may be provided with a pressure sensor 110, for measuring pressure inside the knock out drum. The pressure sensor may measure, for instance, pressure at two or more different levels inside the drum allowing to determine a pressure difference $\Delta P_{KOD}$ across the drum. A second pressure sensor 112 may be provided to measure a pressure $P_{KOD,in}$ in the inlet flow line of the drum 102, comprising the process stream 26.

The process stream 106 can be provided to two or more dehydration units 50 arranged in parallel, indicated by 'Bed-A', 'Bed-B', 'Bed-C', respectively. Each unit 50 may be provided with an inlet valve 114A, 114B, 114C, for opening or closing the inlet of the respective unit 50. The inlet flow conduit of each unit may be provided with a pressure sensor 116A, 116B, 116C and/or a temperature sensor 118A, 118B, 118C. Alternatively, or in addition, flow sensors may be provided in any of the conduits, such as conduit 106, providing process streams to the dehydration units 50.

A process stream outlet of each unit 50 may be provided with temperature sensor 120A, 120B, 120C. Downstream of the process stream outlet of the respective molsieve beds 50, valves 122A, 122B, 122C and 124A, 124B, 124C may be provided to open or close a fluid passage towards outlet conduit 126 or towards a heater 128 respectively. The outlet conduit 126 may be connected to an outlet of the molsieve system 100, providing molsieve outlet stream 29. The outlet conduit may be provided with sensors or probes 130, 132 for measuring, for instance, water content or CO2 content respectively. The heater 128 may be preceded by a first flow switch 134, for selecting a flow line to one of the valves 124A, 124B, 124C.

An outlet of the heater 128 may be connected via conduit 136 to a heater inlet of respective dehydration units 50A, 50B, 50C. A regeneration gas outlet 138A, 138B, 138C of the respective units 50A, 50B, 50C may be connected to respective flow conduits provided with a valve 140A, 140B, 140C for opening or closing the respective conduit. Said conduits may be connected to a second flow switch 142 for selecting one of the conduits. Flow switch herein may relate to a selection of valves, wherein the valves are opened and closed to ensure the correct line-up. The second switch 142 may be connected to cooler (not shown) and then to a second knock out drum 144, functioning as a separator. A liquid stream 146, with increased water content, may be drained from a lower end of the separator 144, while a gaseous stream 148 with reduced water content may be provided from a top end of the drum 144. The gaseous stream 148 may be provided to a pump or compressor 150 to increase the pressure of said stream. The gaseous stream 148 may be recombined with the inlet process stream 26.

Regeneration may work otherwise as well. For instance, alternatively, regeneration gas may be taken from outlet conduit 126 and routed to heater 128 with a bypass (not shown) around 128. The gas from heater 128 can be sent via conduit 136 to switching valves 124 A, B or C to molsieve units 50 A, B or C.

Optionally, the regeneration gas out of the vessels 50, through one of lines 138 A, B or C, may be taken from below respective valves 114 A, B or C and above respective temperature sensors 118 A, B, or C and then via valves 140 A, B, or C to a cooler (not shown) and then to knock-out drum 144.

In addition, there may be a regeneration gas bypass line (not shown) allowing regeneration gas to bypasss vessels 50. For instance, the bypass line may connect a location upstream or downstream of the heater 128 to a location upstream or downstream of the knock-out drum 144.

Furthermore, an alternative regeneration gas may be taken from a source external to dehydration unit 100, for instance nitrogen from a nitrogen supply system, and gaseous stream 148 may be routed out of dehydration unit 100 for further processing or disposal.

A dehydration unit 100 in regenerative mode operation may have two or more dehydration units 50. Excess moisture from the treated gas 26 is removed via adsorption-regeneration cycles at each bed, as indicated in FIG. 5.

Figures 5, 6:
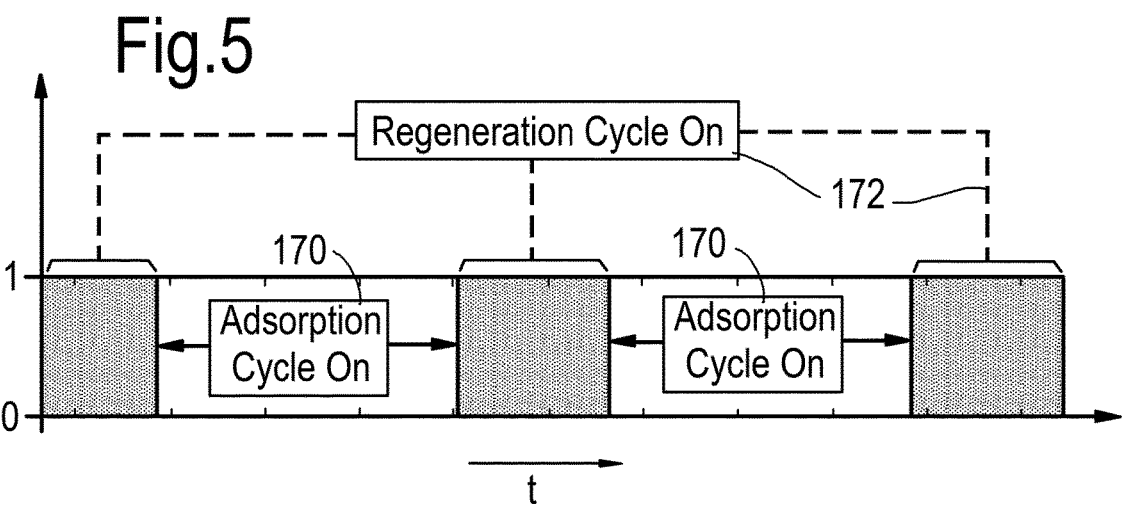
FIG. 5 schematically shows how each adsorption bed is subjected to different consecutive steps during operation of an adsorption unit for a system and method of the present disclosure.
FIG. 6 schematically shows a cross section of an adsorption unit as modelled for a method of the present disclosure.

The diagram of FIG. 5 shows an example of regenerative mode operation cycles of a dehydration unit 100. Herein, for each dehydration unit 50, adsorption cycles 170 are followed by regeneration cycles 172. The horizontal axis indicates time t, while the vertical axis indicates adsorption state 1 or regeneration state 0. In the adsorption state 1, the inlet valve 114 and outlet valve 122 of the corresponding dehydration unit 50 are in an open position, while the corresponding regeneration valves 124 and 140 are in a closed position. In the regeneration state 0, the inlet valve 114 and outlet valve 122 of the corresponding dehydration unit 50 are in a closed position, while the corresponding regeneration valves 124 and 140 are in an open position. In the regeneration state, part of the process stream (i.e. an outlet stream of a respective adsorption unit 50; for instance, opened or closed by the valves 124A-C) may be looped back to the inlet via the heater 128, for regeneration of the molsieve bed.

To minimize costs and maximize economic viability, aim is to minimize the number of regenerative cycles 172 for a desired time of operation and maximize the duration of each adsorption cycle 170.

Referring to FIG. 6, for a total number of three molsieve units 50 in parallel, at any given point in time, two units 50 may be in adsorption mode 170 while one unit 50 may be in regeneration mode 172. A molsieve unit 50 may also be in "stand-by" mode 174 (indicated by S), i.e. neither in adsorption mode 170 nor in regeneration mode 172. The regeneration mode 172 may include a period of heating H and a period of cooling C.

The high temperature during regeneration causes water to desorb from the molecular sieve, preparing it for its next adsorption step at lower temperature. This method of operating the dehydration unit 100 is a process called temperature swing adsorption (TSA). Although TSA is a discontinuous process for each individual unit 50, the overall dehydration unit 100 behaves like a continuous process because one or more units 50 are always in adsorption mode, while at least one other unit 50 is in regeneration mode.

As indicated in FIG. 4, regeneration gas used during the regeneration cycle 172 may be a side (slip) stream of the product stream (for instance approximately 10% of the process stream). Downstream of the adsorber unit 50, the wet regeneration gas (flowing through one of valves 140A, 140B, 140C) may be cooled (in a cooler or heat exchanger, not shown), and water is condensed and subsequently removed as bottom stream 146 in the knockout (KO) drum 144. When a molecular sieve unit 50 is used for dehydration, it is possible to send the regeneration gas back to the feed 26 (or further upstream, e.g. to feed stream 10) after compression to negate the pressure drop. Sending the regeneration gas back to the feed minimizes valuable product losses. The type of lineup shown in, for instance, FIG. 4 is designed for water removal, as knocking out the water in the regeneration knock-out drum 144 provides a drain of water 146 from the system. Components that cannot be removed sufficiently from the loop in such a manner (for instance sulfur species, such as H2S) will build up in the regeneration gas loop. Consequently, in such a lineup, the regeneration gas has preferably first been treated by an appropriate absorption unit, such as AGRU 17, before it can be reinjected in the feed gas.

Figure 7:
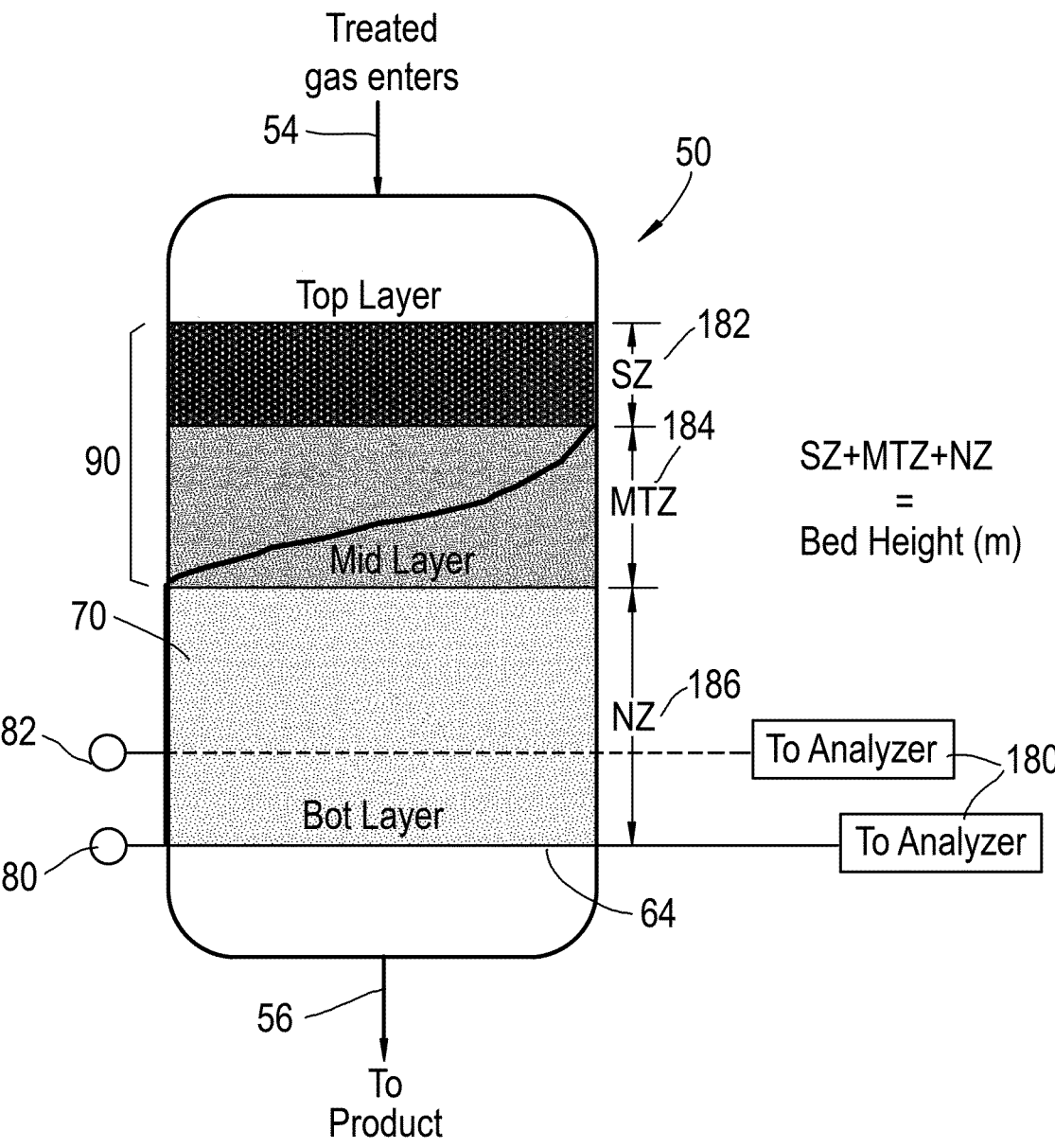
FIG. 7 schematically shows an adsorption bed at a particular moment in an adsorption step in the adsorption unit of FIG. 6.

FIG. 7 shows a stylized exemplary embodiment of a dehydration unit 50. The unit may be provided with at least one but preferably two sensors 80, 82 allowing measurement of the water content of the gas. Analyzers 180 are similar in function to analyzer 85 shown in FIG. 2.

During operation, the molsieve bed 70 of each unit 50 may have three distinct zones (as shown in FIG. 7), which develop during every adsorption cycle as the water loading increases, in analogy with FIG. 3. The three zones may be referred to as:

Saturated Zone 182 [SZ]. The molsieve bed 70 in this zone is saturated with moisture and water in the process stream passes the saturated zone without being adsorbed;

Mass Transfer Zone 184 [MTZ]. Herein, moisture in the process stream is at least partly transferred to the molsieve bed 70, being adsorbed in the pores of the molsieve bed 70; and Non-utilized Zone 186 [NZ]. Herein, the water content of the gas is at or below the desired very low level $Y_0$. Practically no more mass transfer of water takes place between the process stream and the molsieve bed. Moisture in the process flow has already been adsorbed in the MTZ. Part of the NZ may typically never be used for mass transfer of water, as a safety margin. "Practically" herein may mean that its effect is so small that it is not noticeable when using moisture sensors that are fit for use in this service. The gas may have a very low level of water ('bone dry', potentially more than zero but below 1 ppm, or alternatively below 0.1 ppm).

Figure 8:
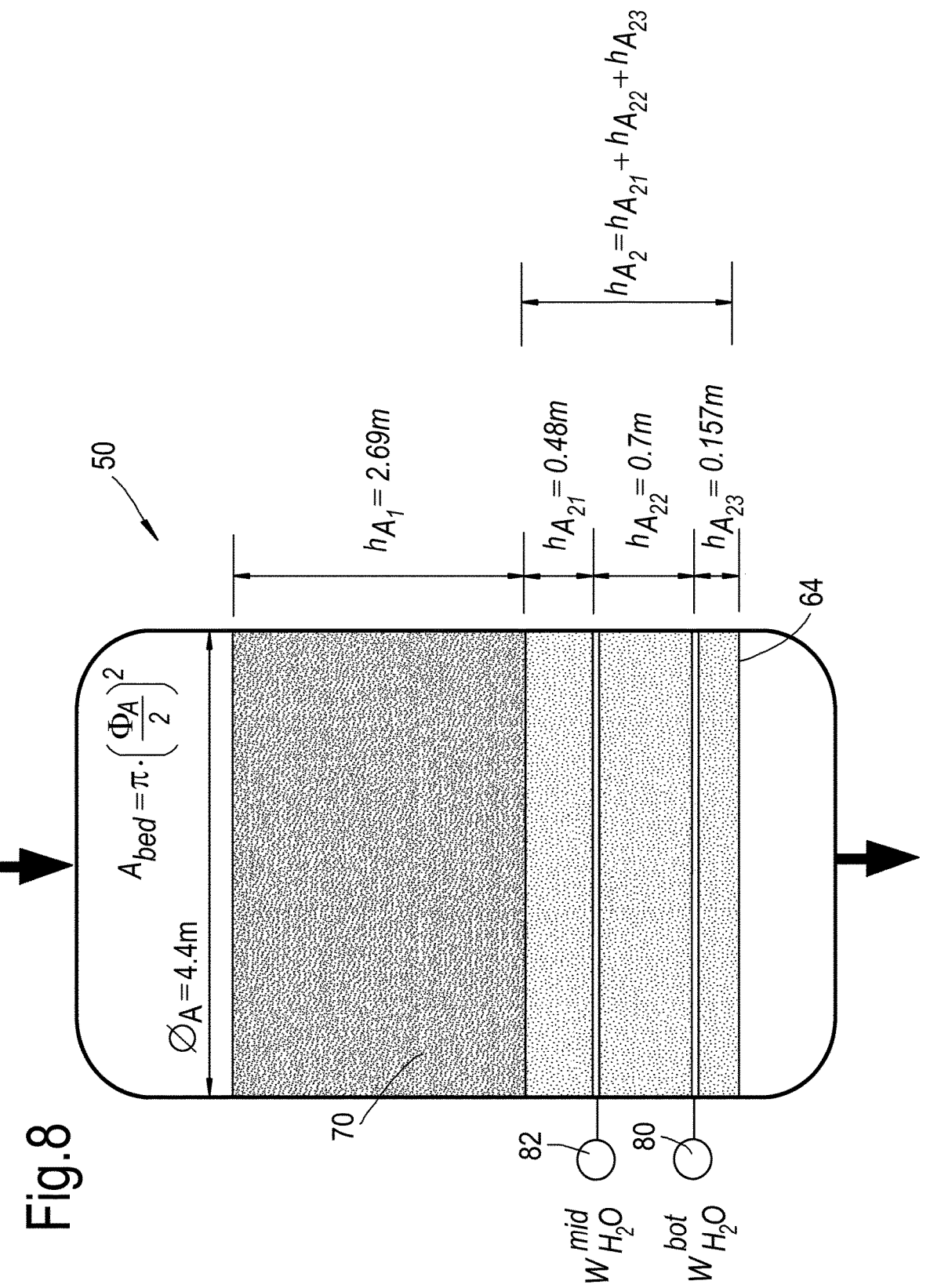
FIG. 8 shows an exemplary embodiment of an adsorption bed in an adsorption unit provided with exemplary sizes.

Referring to FIG. 8, in a practical embodiment, a molsieve bed 70 may have a height in the order of 2 to 12 m. The first probe 81 as part of sensor 80 may be located slightly, for instance about 5 to 25 cm, above the bottom of the molsieve bed 64. The second probe 83 as part of sensor 82 may be located about 50 to 100 cm above said bottom of the molsieve bed 64.

Different types of mol sieve adsorbent materials may, in practice, be added to each molsieve bed 70, typically a layer of larger particles, e.g in the range of 2.5-5 mm diameter; and/or a layer of smaller particles, e.g. in the range of 0.5-2.5 mm. Combinations of layers of mol sieves based on different zeolites is also possible, e.g. layers of 4 A and/or 5 A and/or 13X mol sieves.

For a more detailed discussion of the setup of a dehydration unit, potential other setups (for example, the number of vessels deployed and configuration) and application thereof for dehydration and regeneration, reference is made to, for instance, *Optimal design and operation of molecular sieve*

*gas dehydration units*, R. H. M. Herold and S. Mokhatab, Gas Processing & LNG, 2017 August [A copy is available at, for instance, http://gasprocessingnews.com/features/201708/optimal-design-and-operation-of-molecular-sieve-gas-dehydration-units % E2%80%94part-1.aspx], which is incorporated by reference.

The treated gas entering each bed at inlet 54 typically may have a water saturation level of 5%-100% of relative humidity at operating conditions, more typically 400 to 700 ppm by volume. The mol sieves in each bed 70 achieve a high degree of water removal efficiency. When the gas exits the bed at the bottom outlet 56, the water concentration in the process stream can be (significantly) below 1 ppm, even below 0.1 ppm. The dry outlet process stream in conduit 56 may be referred to as bone dry gas.

The adsorption cycle time, in hours, of each dehydration unit 50A, 50B, 50C is typically adjusted such that bone-dry gas exits the bottom of each bed, during the adsorption cycle 170. As mentioned above, the end of the adsorption cycle of each bed is typically succeeded by a regenerative cycle 172 where the moisture trapped in the porous mol sieves is taken out through the top of the bed. The pairs of valves at the top (valves 114, 140) and at the bottom (valves 122, 124) of each dehydration unit 50 control the sequencing of adsorption-regeneration cycles.

Figure 9:
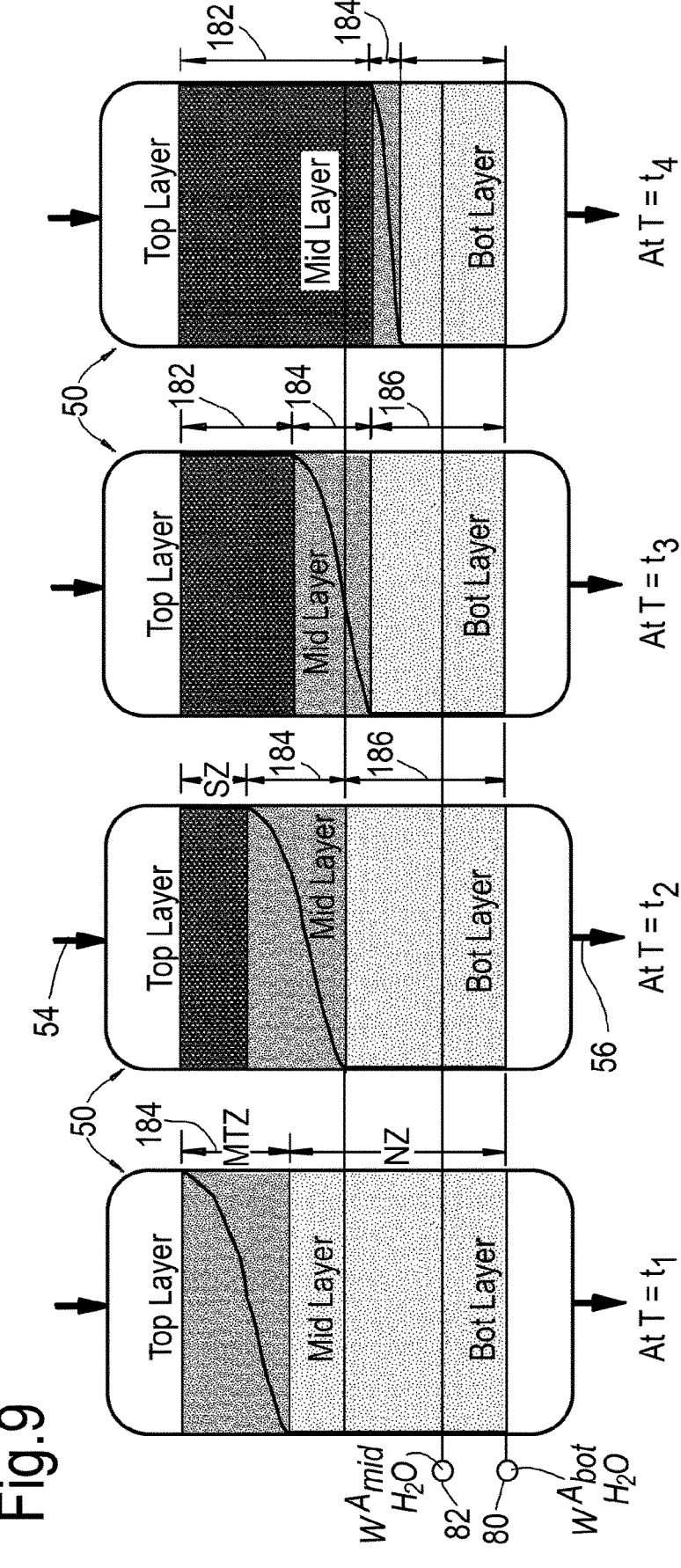
FIG. 9 shows a cross section of an adsorption bed in an adsorption unit in use at consecutive moments in time.

FIG. 9 schematically shows how the Saturated Zone 182 [SZ], Mass Transfer Zone 184 [MTZ], and Non-utilized Zone 186 [NZ] change at consecutive times $t_1$ to $t_4$ during an adsorption cycle 170.

Conventionally, sensor 82 may be monitored and the adsorption cycle of the bed may be terminated when water is detected in the gas sampled from associated sampling probe 83 up to a predetermined threshold, such as 1 ppm of water. The term water herein may include water, water vapor, and moisture. The adsorption process is terminated at the set threshold as a precautionary measure, to ensure that only extremely small amounts of moisture are included in the outlet stream 56 of the respective bed. This precautionary measure has the effect of reducing the adsorption time 170 of the bed and increasing the number of regeneration cycles 172 in the lifetime of the respective molsieve bed 70.

However, in addition, every regeneration cycle 172 has the effect of contributing to some amount of irreversible degradation of the mol sieve bed 70. During heating step H of the regeneration cycle 172, the molsieve bed 70 is subjected to high temperatures (depending on the type of molsieve material, up to in the order of 320° C.). As a result of this regeneration, the molsieve bed 70 degrades. Therefore, the more regeneration cycles, the sooner the mol sieve bed 70 will reach end of life, which is determined by the minimum required water removal capacity to keep the dehydration unit in operation at the desired feed flow rate without water breakthrough in the bone-dry gas. In other words, after every regeneration cycle 172, the bed 70 loses some of its adsorption capacity.

The present invention describes a methodology by which on-line sensor data is combined with physical and/or empirical models to estimate the molsieve bed water removal capacity degradation over the current and remaining adsorption cycles of the current run of a molsieve bed based on estimated water adsorption capacities from previous adsorption cycles in the current run and/or from previous runs. Herein, "run" is the period between the time a respective dehydration system starts operating after fresh molsieves were loaded in the vessels of each unit and the time the system is stopped for replacement of the (degraded) molsieves by another load of fresh molsieves.

The models may be developed using molsieve bed configuration parameters (e.g. molsieve bed diameter, heights of the different layers of molsieve, molsieve particle sizes, shapes and bed bulk densities for the different layers), mass and heat transfer characteristics for each layer in the molsieve bed to determine how deep into the bed the water has penetrated, data on molsieve water adsorption capacity and its degradation during operation of the MSU (e.g. fresh molsieve capacity as provided by a vendor) and sensor data (for instance feed gas flow rate and moisture content). The model may use a formula (1) as shown below:

$$W = q_{current} * (L_{SZ,current} c * L_{MTZ,current}) * A_{bed} * \rho_{bulk} \qquad (1)$$

Herein:

W is the total mass of water adsorbed in a particular molsieve bed of the dehydration unit at a given point in time in its current adsorption cycle 170 [kg];

$q_{current}$ is the SZ molsieve water adsorption capacity (expressed for instance in [kg of water/kg of molsieve material]) for the current adsorption cycle of the same bed. An estimate of $q_{current}$ can an be derived from adsorption capacity degradation model which relates $q_{current}$ to (at least) the adsorption cycle number. In its simplest form this degradation model may be a straight line. Said degradation model may be subject to a correction method delineated in this disclosure (for instance as described below). Optionally, at the start of the very first adsorption cycle of a run, $q_{current}$ may be taken as the fresh adsorbent capacity ($q_{SOR}$). Herein, $q_{sor}$ may be provided by the vendor of the molsieve material or determined from laboratory or breakthrough testing;

$L_{SZ,current}$ is the estimated bed length from the top of the molsieve bed to the lower front of the SZ (corresponding to the upper front of the MTZ) for the same bed and at the same point in time as W; $L_{SZ,current}$ starts at 0 and will increase only once the MTZ has fully developed in the molsieve bed during an adsorption cycle;

$L_{MTZ,current}$ is the estimated length of the MTZ for the same bed and at the same point in time as W; $L_{MTZ,current}$ increases from 0 at the start of an adsorption cycle;

c is a factor indicating the fraction of $q_{current}$ that applies to the MTZ, making $c * q_{current}$ the effective water adsorption capacity of the MTZ; c may typically be taken as a constant for each layer in the molsieve bed, or may vary depending on mass transfer characteristics;

$A_{bed}$ is the molsieve bed cross sectional area [m²]; this is typically constant over the entire height of molsieve bed 70 but may vary depending on the exact location of the molsieve bed in vessel 52; and $\rho_{bulk}$ is the molsieve bed bulk density [kg/m³]; this is estimated from the molsieve particle properties (size, shape and density) and loading method applied to load the molsieve particles in vessel 52 for each layer of molsieve in bed 70.

Figure 10:
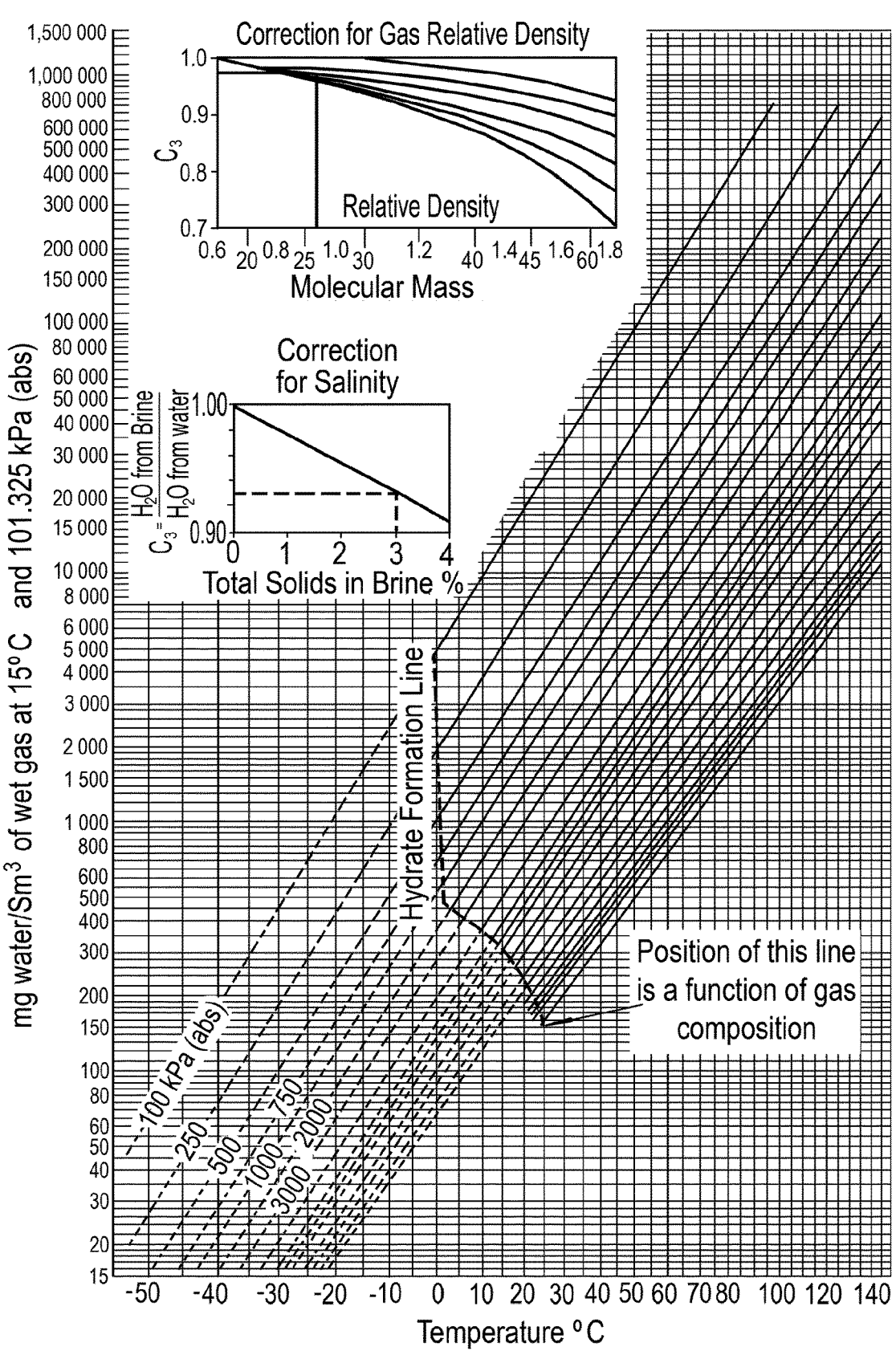
FIG. 10 shows an example of a chart (a so-called McKetta-Wehe chart) to estimate the water content of gas.

To estimate W, feed gas process parameters such as flow rate, pressure, temperature and composition may be obtained from on-line sensor data through systems that retrieve and record such real-time plant data, for example process control systems (e.g. DCS, PLC, SCADA), plant data historian applications or other such systems. Using the above parameters, the water content of the feed gas may be estimated using thermodynamic correlations or charts, such as a McKetta-Wehe Chart. The McKetta-Wehe chart has been published in, for instance, the GPSA Engineering Data Book. For an example, see FIG. 10. Also, reference is made to, for instance, "Water content assessment in acid gas" by A. Terrigeol et al., GPA Europe, Annual Conference, Florence, Italy 16-18 Sep. 2015. Alternatively, the feed gas water content may be obtained from a moisture sensor connected to conduit 26 or 106.

From the feed gas process parameters and its water content, and considering all the water from the feed gas is adsorbed, the accumulated quantity of water W that is adsorbed by a molsieve bed since the start of the current adsorption cycle, i.e. for any given time period ($t-t_{start}$), can be estimated. Time period ($t-t_{start}$) is the time into a respective adsorption cycle, i.e. the present time t minus the start time of the adsorption cycle $t_{start}$.

$L_{SZ,current}$ and $L_{MTZ,current}$ may be estimated using models based on appropriate relationships for mass and heat transfer in packed beds of porous solids used in industrial adsorption processes, as published in numerous text books, e.g. "Principles of Adsorption and Adsorption Processes" by D. M. Ruthven (1984) or "Gas Separation by Adsorption Processes" by R. T. Yang (1987). One such model may be the Linear Driving Force model, but other models may also be used. These models may be used to calculate the concentration profile of water along the molsieve bed height h at a given time tin the current adsorption cycle (similar to FIG. 9) from which the $L_{SZ,current}$ and $L_{MTZ,current}$ can be derived. Such models may use formulas (2) and (3) as shown below.

$$v_g \frac{\partial C}{\partial h} + \frac{\partial C}{\partial t} + \left(\frac{1-\varepsilon}{\varepsilon}\right)\frac{\partial \bar{q}}{\partial t} = 0 \qquad (2)$$

$$\frac{\partial \bar{q}}{\partial t} = \frac{15 D_e}{R_p^2}(q^* - \bar{q}) \qquad (3)$$

Herein:

$v_g$ is the superficial gas velocity in the bed defined as volumetric feed gas flow rate divided by the cross-sectional area of the bed $A_{bed}$;

C is the concentration of water in the gas (at a given height h in the bed at a given time t);

$\varepsilon$ is the porosity of the molsieve bed; this is estimated from the molsieve particle properties (size, shape and density) and loading method applied to load the molsieve particles in vessel 52 for each layer of molsieve;

$\bar{q}$ is the current water loading of the molsieve particles (at a given height h in the bed at a given time t);

$q^*$ is the water loading of the molsieve particles that is in equilibrium with the water concentration in the gas (at a given height h in the bed at a given time t); in the saturation zone SZ $\bar{q}$ is equal to $q^*$ and both are directly related to $q_{current}$ via the mass of mol sieve in SZ;

$D_e$ is the effective diffusivity of water from the bulk gas to the adsorption sites inside the molsieve particles in a layer; and $R_p$ is the radius of molsieve particles in a layer The aforementioned models may need to be coupled with relationships that describe the actual adsorption of a component ("adsorbate") on the (internal) surface of an adsorbent as a function of temperature and/or partial pressure of the adsorbate. Such relationships may be in the form of adsorption isotherm models, e.g. Langmuir, Dubinin-Astakhov or other such models. An example of a Langmuir isotherm is indicated in Formula (4). Herein, b is a constant and $q_s$ is the maximum saturation water loading of the molsieve (at water saturation of the gas) which is directly related to $q_{current}$ via the mass of molsieve at height h. Adsorption isotherms for water on most industrially used molsieves are available, for instance from the NIST database (https://adsorption.nist.gov/index.php#home) or can be determined by (laboratory) testing.

$$\frac{q^*}{q_s} = \frac{b \cdot C}{1 + b \cdot C} \qquad (4)$$

Alternatively, $L_{MTZ,current}$ may be estimated using empirical relationships based on relevant process parameters (for instance feed gas flow rate, water content) and mol sieve bed parameters (for instance bed diameter, shape and size of molsieve particles). Such relationships may be obtained in cooperation with the vendor of the mol sieves or from publications. One example of the latter is "Gas Purification $5^{th}$ Edition" by Kohl & Nielsen (2007) where $L_{MTZ,current}$ is a function of the superficial gas velocity $v_g$ and a constant who's value depends on the particle size. Formula (5) shows the function for $\frac{1}{16}$" molsieve particles.

$$L_{MTZ,current} = 0.85 \left( \frac{v_g}{35} \right)^{0.3} \qquad (5)$$

As an alternative, another example to estimate $L_{MTZ,current}$ is provided in "Gas Conditioning and Processing Vol 2" by J. M. Campbell (1984). Herein, $L_{MTZ,current}$ is a function of the water adsorption capacity $q_{current}$, the superficial gas velocity $v_g$ and the water concentration in the feed gas.

From the estimated $L_{MTZ,current}$ the value of $L_{SZ,current}$ can be derived using Formula (1).

Using the models and relationships mentioned above, Formula (1) can be re-written as:

$$q_{current} = f(w, L_{SZ,current} + L_{MTZ,current}, A_{bed}, \rho_{bulk}) \qquad (6)$$

For instance:

$$q_{current} = W / [(L_{SZ,current} c^* L_{MTZ,current})^* A_{bed}^* \rho_{bulk}] \qquad (7)$$

Upon detection of water or moisture in gas sampled through one of the sampling ports, the exact position of the front of the MTZ (and thus also $L_{SZ,current} + L_{MTZ,current}$) is known, i.e. said front is at the level of the respective port. In case of the first sampling port, typically mid-port 83, the front of the MTZ is at the level of port 83. $L_{SZ,current} + L_{MTZ,current}$ is then computed as the height of the molsieve bed above the respective sampling port.

During this period from starting of the cycle and water detection time, the quantity of water adsorbed (W) can be estimated as explained above. Thus, knowing all the parameters in the right side of formula (6), $q_{current}$ can be computed.

Calculating $q_{current}$ for multiple adsorption cycles from the first cycle of fresh molsieves allows gaining insight into how the water adsorption capacity is degrading over the adsorption cycles for the current load of molsieves under the current operating conditions. This allows automated adaptation of an adsorption capacity degradation model (through feed-back correction) which may in turn be used to predict the adsorption capacities in the cycles ahead. The accuracy of the adsorption capacity degradation model will improve with more cycles for which $q_{current}$ can be calculated (more frequent feed-back), improving the accuracy of the predictions. In cases this may also lead to early detection of a significant change in adsorption capacity degradation rate which may result, for instance, from changes in feed gas composition or operating conditions, or from process upsets or equipment malfunction.

The molsieve bed is typically designed for a certain minimum water adsorption capacity. When the bed capacity approaches this value, the bed must be replaced with fresh molsieve material, otherwise the bed under regeneration will not have enough time for complete regeneration before breakthrough happens on one of the beds in adsorption. Thus, the estimation of current adsorbent capacities for multiple adsorption cycles and automated adapting of an adsorption capacity degradation model helps to monitor adsorption capacity degradation, react early to unexpected changes in degradation rate, predict the useful life of the molsieve bed and plan for the next change out. In an embodiment, the method may obviate having to conduct periodic breakthrough tests. Furthermore, the methodology of the present disclosure can also be used to monitor the mass transfer zone [MTZ] travel through the bed and the time it takes for the MTZ to reach or cross specific locations of the bed. An accurate real-time prediction of the time remaining for the MTZ to reach the end of the molsieve bed allows to maximize the duration of each adsorption cycle, thereby further maximizing the useful life of the molsieve bed.

The methodology described in the present disclosure may use the following measurements and sensors:

Feed flow rate [typically in units of tonnes per day or kilo-normal m3 per hour or normal m3 per hour]; for instance, measured by flow rate sensor 108;

feed pressure [typically in units of barg or psig]; for instance, as measured by one of sensors 112, 116A, 116B, 116C;

feed and product temperatures [typically in units of ° C. or ° F.]; for instance, as measured by sensors 118A, 118B, 118C, 120A, 120B, 120C;

moisture content of the feed [typically in units of mol-ppm]; for instance, as measured by a moisture sensor connected to a sampling probe in conduit 26 or 106 (not shown);

statuses [unitless: open/closed] of adsorption valves around the molsieve vessels, for instance as measured by proximity sensors (not shown) on valves 114A, 114B, 114C, 120A, 120B, 120C, 124A, 124B, 124C, 140A, 140B, 140C;

moisture content of gas sampled from sampling port(s) at specified location(s) in the molsieve bed [typically in units of mol-ppm]; for instance, as measured by (one of) moisture sensor(s) 80, 82;

moisture content of the product gas [typically in units of mol-ppm]; for instance, as measured by moisture sensor 130;

regeneration gas flow rate [typically in units of tonnes per day or normal m3 per hour]; for instance, as measured by a flow rate sensor (not shown) at any location in the regeneration loop, for instance connected to the conduit 136 connected to heater 128 or in line 148;

regeneration gas pressure at KOD 144 [typically in units of barg or psig]; for instance, as measured by a pressure sensor at the inlet conduit or the top outlet conduit of KOD 144 (not shown); and regeneration gas temperature at KOD 144 [typically in units of ° C. or ° F.]; for instance, as measured by a temperature sensor at the inlet conduit or the top outlet conduit of KOD 144 (not shown);

A method in accordance with the present disclosure may include one or more of the following steps:

1. Gather real time data from one or more of the above-mentioned sensors at a desired time resolution. The sensors may include a feed gas flow rate sensor and a moisture content sensor, for measuring features of the gas flowing into the dehydration system. The time resolution may be in the order of seconds or minutes, for instance about 1 minute, or longer.

2. For each bed, estimate the variables W, $L_{SZ,current}$ and $L_{MTZ,current}$ based on data gathered in step 1 and an estimate of $q_{current}$. Estimating the latter variables herein may include estimating from the start of each adsorption cycle, and at a time resolution equal to or longer than the time resolution used in step 1.

The estimate of $q_{current}$ may be derived from an adsorption capacity degradation model, which relates $q_{current}$ to the adsorption cycle number and possibly other variables through one or more relevant model parameters. In its simplest form the degradation model may be a straight line, but more complex models may also be used. For the first adsorption cycle an initial estimate of an adsorption capacity degradation model needs to be provided to estimate $q_{current}$.

At the start of a run of adsorption cycles, a first degradation model is used. Said first model may be provided by the vendor of the adsorption material or molsieve material. The method of the disclosure allows to use and adapt the first capacity degradation model during the run so that you can predict remaining life and spot changes in degradation rate early. Herein, the first model may be replaced with an updated model, i.e with a second degradation model. Conventional methods by vendors are based on using a fixed, first degradation model, but in practice there may be significant deviations between the first model and a particular dehydration unit in operation at a site. The actual degradation of the adsorption material may, in fact, be different for different dehydration units at a site or even between different runs of the same unit.

Optionally, compute the MTZ location in the bed (from $L_{SZ,current}$ and $L_{MTZ,current}$) and the time it takes for the MTZ to reach one or more locations in a respective molsieve bed. The latter may be calculated using an expected feed gas flow, pressure, temperature and water content for the remainder of the adsorption cycle, which may be based on (averaged) historical data for these parameters.

3. Monitor the one or more moisture sensors 80, 82 placed at a specific position in a respective molsieve bed to detect water breakthrough with respect to a certain critical threshold. Said threshold can be expressed in, for instance, mol-ppm. The logic to detect water breakthrough in real time is as follows: (a) Monitor the moisture sensor with respect to a threshold on a running mean basis; (b) if the sensor detects water at a concentration that exceeds this threshold then conclude that water breakthrough has happened. In a practical embodiment, at least one sensor is measuring gas samples. Said at least one sensor may be connected to sampling port 83, located a predetermined distance above the bottom of the respective molsieve bed.

4. If water breakthrough has happened as per step 3, calculate $q_{current}$ (formula 6) using the total water adsorbed at the breakthrough time (W) and the molsieve bed height above the sampling port where moisture was detected in step 3 ($L_{SZ,current}+L_{MTZ,current}$).

5. Optionally, once water breakthrough has happened during a given adsorption cycle, use the latest calculated value for $q_{current}$. In a preferred embodiment, the latest calculated value for $q_{current}$ may be used together with some or all previously calculated values for $q_{current}$ since the first adsorption cycle in a run. Using the latest value for $q_{current}$ allows to automatically adapt the adsorption capacity degradation model. This creates a new version of the degradation model with adjusted values for one or more of the model parameters, for instance referred to as adapted model or second degradation model. This constitutes a feed-back correction mechanism on the degradation model. The method includes using the adapted degradation model to forecast $q_{current}$ for the future adsorption cycles until a potential next adaptation of the degradation model happens.

To explain step 5, for instance, the table below provides a number of cycles (left column) and exemplary values of the respective $q_{current}$ as calculated (using formula 7) during or at the end of each cycle.

| Cycles | Qcurrent |
|---|---|
| 1 | 22 |
| 2 | 22 |
| 3 | 21.9 |
| 4 | 21.9 |
| 5 | 21.6 |
| 6 | 20 |
| 7 | 19.6 |
| 8 | 18.5 |
| 9 | 18 |
| 10 | 17.9 |

Figure 11:
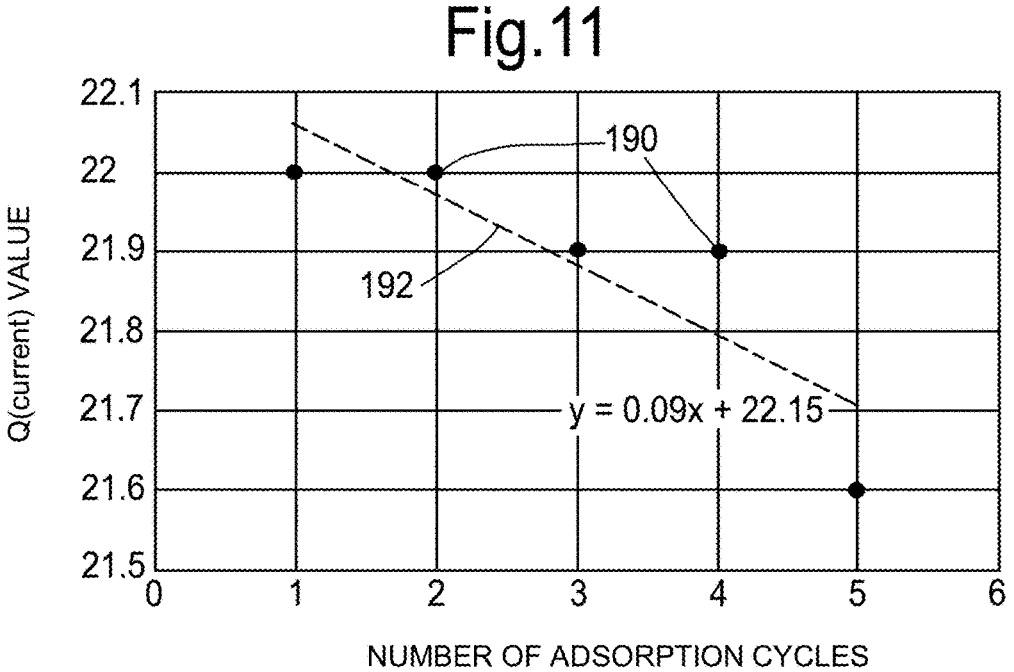
FIG. 11 shows an exemplary diagram indicating a step during execution of the method of the present disclosure.
Figure 12:
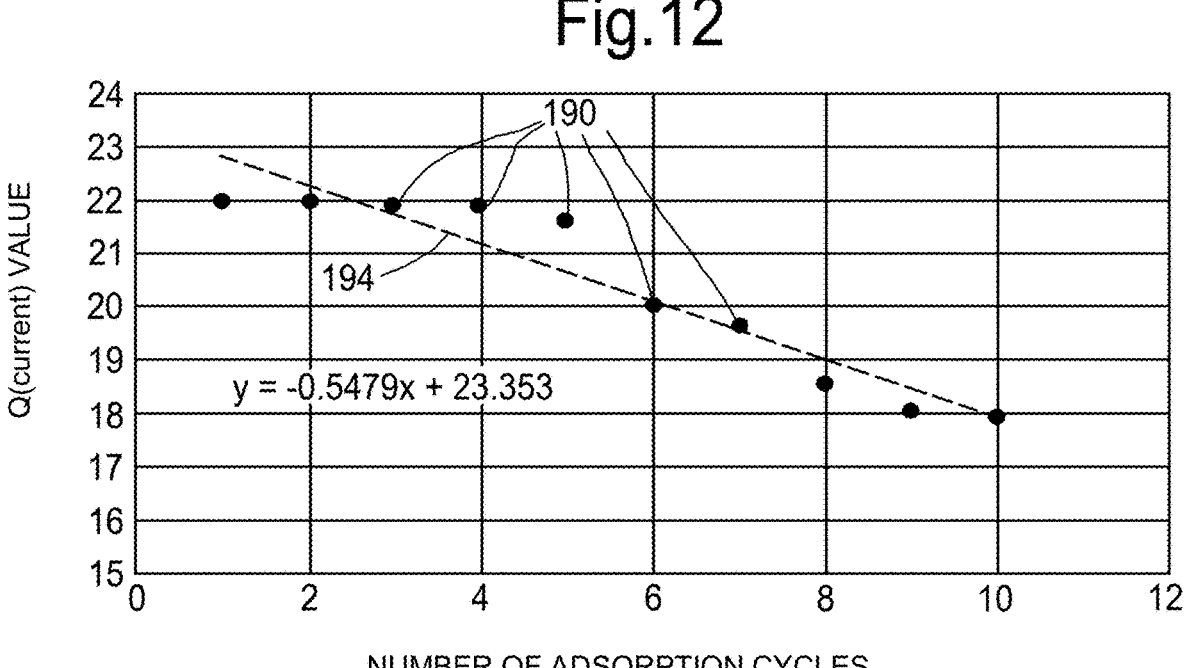
FIG. 12 shows an exemplary diagram indicating a repetition of the step of FIG. 11 during a subsequent cycle of the method of the present disclosure.

FIGS. 11 and 12 show the data points 190 of the table above, after five cycles and after 10 cycles respectively. Both figures also include line 192, 194 respectively which, in this example, represent different versions of the adsorption capacity degradation model. Line 192, 194 is, for instance, a trend line or line of best fit from linear regression, fitted to the data points 190. Lines 192, 194 may represent any other suitable model as described in the present disclosure.

The adapted degradation model from the linear regression enables to estimate a value for $q_{current}$ for the next cycle, i.e. the cycle for which no data point 190 is yet available (cycle 6 for FIG. 11 and cycle 11 for FIG. 12). Said estimated value for $q_{current}$ from step 5 is used in formula (1) during step 2 of the next adsorption cycle.

6. If water breakthrough does not happen as per step 3 for a particular cycle and the respective bed is switched out for regeneration (for instance for operational reasons), maintain the latest version of the adsorption capacity degradation model to estimate $q_{current}$ for the next adsorption cycle.

7. Optionally, use the latest version of the adsorption capacity degradation model, ideally combined with the operational plan for the dehydration unit, to recalculate the remaining number of adsorption cycles and estimate the associated remaining time until $q_{current}$ reaches $q_{EOR}$. Herein, EOR means End of Run, indicating that the bed needs to be replaced, for instance by fresh molsieve. $q_{EOR}$ is a predetermined minimum threshold of adsorption capacity q to keep the dehydration unit in operation at the desired feed flow rate without water breakthrough in the bone-dry gas.

8. Repeat steps 1 to 7 until the molsieve bed is replaced from dehydration unit 50.

The method and system of the present disclosure enable to run longer adsorption cycles by understanding where the MTZ is inside a bed and when to expect breakthrough. By pushing for longer adsorption times per adsorption cycle (variable cycle timing) the overall uptime and lifetime of a molsieve bed is extended.

The current disclosure can use sensor data to calibrate and recalibrate models for calculating the in situ degradation of the water adsorption capacity of a molsieve bed during the current run. This improves understanding of the remaining useful life of the molsieve bed and hence the remaining time until the End of Run condition is met and the dehydration unit needs to be stopped for replacing the molsieves. In addition, the algorithm provides information on the MTZ location in the bed during every adsorption cycle. The MTZ location can for instance be provided virtually in real time, for instance on a minute-by-minute basis. The method of the disclosure provides a relatively simple, effective and accurate tool to predict water breakthrough in a molsieve bed. Thus, the method and system of the disclosure can prevent water in the outlet stream and the corresponding negative impact, whilst improving overall reliability and lifetime of molsieve beds in a dehydration unit.

The method and system of the present disclosure involve using and adapting a capacity degradation model during the run of adsorption cycles, allowing to predict remaining life of an adsorption bed and spot changes in degradation rate early. Conventional methods (typically by vendors) use a fixed degradation model. However, in practice there may be a significant deviation between the fixed degradation model and the degradation of an adsorption bed in a particular dehydration unit at a site. The actual degradation may in fact be different for different units at a site or even between different runs of the same unit. The method of the present disclosure allows to adapt the degradation model, based on real-time process data. The model can be adapted as often as required. The model can be adapted for one or more, or even for every adsorption cycle in a run.

The present disclosure is not limited to the embodiments as described above and the appended claims. Many modifications are conceivable, and features of respective embodiments may be combined.

We claim:

1. Method for operating an adsorption-based system for removing water and potentially other components from a process feed stream, the system including at least two dehydration units, each comprising an adsorption bed, the method including the steps of:

i) providing an initial adsorption capacity as adsorption capacity estimate for each adsorption bed for a first adsorption cycle;

ii) dehydrating the process feed stream by operating the adsorption-based system in regenerative mode, wherein at least one unit of the at least two dehydration units is in an adsorption cycle, att4—wherein at least another unit of the at least two dehydration units is being regenerated, wherein each unit of the at least two dehydration units comprises an adsorbent and wherein the process feed stream comprises at least one hydrocarbon;

iii) obtaining process data in real-time from one or more sensors at a predetermined time resolution, the sensors comprising at least one moisture sensor at a specified location in each of the dehydration units;

iv) estimating an updated adsorption capacity for each adsorption bed based on a first adsorption capacity degradation model and the process data obtained in step iii);

v) for a subsequent adsorption cycle, replacing the adsorption capacity estimate provided in step i) for each bed with the updated adsorption capacity estimated in step iv);

vi) monitoring the at least one moisture sensor during each adsorption cycle to detect water breakthrough with respect to a threshold;

vii) estimating a quantity of water adsorbed by a respective adsorption bed at the time of water breakthrough;

viii) calculate an updated water adsorption capacity estimate ($q_{current}$) using the formula:

$$q_{current}=W/[(L_{sz,current}+C*L_{MTZ,current})*A_{bed}*\rho_{bulk}]$$

wherein:

W is the quantity of water adsorbed by the respective adsorbent bed at the time of breakthrough;

$L_{sz,current}$ is an estimated bed length from a top of the respective adsorbent bed to a lower front of a Saturated Zone for the same bed and at the same point in time as W;

$L_{MTZ,current}$ is the estimated length of a mass transfer zone (MTZ) for the same bed and at the same point in time as W;

$A_{bed}$ is cross sectional area of the respective adsorption bed; and $\rho_{bulk}$ is a bulk density of the respective adsorbent bed;

ix) using the updated adsorption capacity estimate from step viii) to provide a second degradation model;

x) replacing the first adsorption capacity degradation model with the second degradation model provided in step ix);

xi) for a subsequent adsorption cycle, estimating the updated adsorption capacity for each adsorption bed based on the second adsorption capacity degradation model;

xii) adjusting an adsorption cycle time of the at least one unit that is in the adsorption cycle based on the updated adsorption capacity; and xiii stopping a flow of the process feed stream to the at least one unit that is in the adsorption cycle at an end of the adsorption cycle time.

2. The method of claim 1, wherein the process data obtained in step iii) includes at least flow rate of the feed, and water content of the feed.

3. The method of claim 1, wherein the sensors include one or more of:

feed stream flow rate sensor;

feed stream pressure sensors;

temperature sensors;

feed stream moisture sensor;

status sensors of adsorption valves for each of the dehydration units;

the at least one moisture sensor comprising at least one sampling probe connected to an analyzer;

product gas moisture sensor;

product gas $CO_2$ sensor, regeneration gas flow rate sensor, regeneration gas pressure sensor; and regeneration gas temperature sensor.

4. The method of claim 1, comprising the step xiv) of using the process data to estimate an updated adsorption bed water adsorption capacity comprising:

monitoring the at least one moisture sensor of the at least one active dehydration unit to detect water breakthrough with respect to a minimum threshold;

estimating a quantity of water adsorbed by the adsorbent bed of the at least one active dehydration unit at the time of water breakthrough; and calculating a current water adsorption capacity ($q_{current}$) of the at least one active dehydration unit when water breakthrough occurs during an adsorption cycle by exceeding the minimum threshold.

5. The method of claim 1, wherein the step of estimating the total water adsorbed at the time of breakthrough time (W) uses parameters of the feed stream including flow rate, pressure, temperature and composition.

6. The method of claim 4, comprising the steps of:

xv) calculating the updated water adsorption capacity estimate ($q_{current}$) using the latest version of the adsorption capacity degradation model if water breakthrough has not happened during an adsorption cycle before a respective adsorption bed is switched out for regeneration, and xvi) using the water adsorption capacity calculated in step xv) in the latest version of the adsorption capacity degradation model for the next adsorption cycle after regeneration.

7. The method of claim 6, comprising the step of:

xvii) using the latest version of the adsorption capacity degradation model to compute a remaining number of adsorption cycles and an associated time until the water adsorption capacity ($q_{current}$) reaches a predetermined replacement value at which the adsorption bed of the respective adsorption unit is to be replaced.

8. The method of claim 7, comprising the step of:

xviii) using the water adsorption capacity ($q_{current}$) to calculate a location of a mass transfer zone (MTZ) in a respective adsorption bed and/or to calculate the time it takes for the MTZ to reach a certain location.

9. The method of claim 8, comprising the step of xix) repeating all steps until a respective dehydration unit reaches its end of life.

10. The method of claim 1, wherein the time resolution is in the order of seconds or minutes.

11. The method of claim 9, comprising the step of xx) calculating water content adsorbed in a respective adsorption bed, based on feed gas flow rate, water content in the feed gas, and duration of a respective adsorption cycle.

12. The method of claim 1, wherein the feed stream comprises natural gas, air, a gas containing predominantly hydrocarbons, and/or hydrogen, and/or $CO_2$, and wherein the adsorption bed is a molecular sieve bed.

13. Adsorption-based system for removing water and potentially other components from a feed stream, the system including:

at least two dehydration units arranged in parallel, each dehydration unit comprising an adsorption bed; and one or more sensors for obtaining process data at a predetermined time resolution, the sensors comprising at least one moisture sensor arranged at a specified location in each of the dehydration units;

the system being adapted for dehydrating the feed stream by operating the system in regenerative mode, wherein at least one active unit of the at least two dehydration units is in an adsorption cycle, and wherein at least another one of the at least two dehydration units is being regenerated; and the system being adapted for using the process data for estimating an adsorption bed water adsorption capacity during every adsorption cycle using the method of claim 1.

14. The method of claim 11, comprising the step of xxi) determining degradation of water adsorption capacity of the adsorbent bed based on the updated adsorption capacity; and of xxii) predicting a remaining life span of the adsorbent based on the water adsorption capacity.

* * * * *